US005160519A

United States Patent [19]

Svensson et al.

[11] Patent Number: 5,160,519

[45] Date of Patent: Nov. 3, 1992

[54] INTAKE AIR FILTER FOR AN INTERNAL COMBUSTION ENGINE

[75] Inventors: Per Svensson; Sten Klippare, both of Göteborg, Sweden

[73] Assignee: AB Volvo, Göteborg, Sweden

[21] Appl. No.: 778,198

[22] PCT Filed: Jul. 4, 1990

[86] PCT No.: PCT/SE90/00479

§ 371 Date: Feb. 11, 1992

§ 102(e) Date: Feb. 11, 1992

[87] PCT Pub. No.: WO91/00423

PCT Pub. Date: Jan. 10, 1991

[30] Foreign Application Priority Data

Jul. 5, 1989 [SE] Sweden ............................... 8902440

[51] Int. Cl.[5] ............................................. B01D 46/00

[52] U.S. Cl. ....................................... 55/482; 55/498; 55/502

[58] Field of Search .......................... 55/482, 498, 502

[56] References Cited

U.S. PATENT DOCUMENTS 3,616,618 11/1971 Gronholz et al. .................... 55/502
4,720,292 1/1988 Engle et al. ........................... 55/502

FOREIGN PATENT DOCUMENTS 2626008 11/1977 Fed. Rep. of Germany .
55-43263 3/1980 Japan .

*Primary Examiner*—Bernard Nozick
*Attorney, Agent, or Firm*—Young & Thompson

[57] ABSTRACT

A filter device, especially an intake air filter for internal combustion engines, comprises a cylindrical filter housing (1) with inlet and outlet openings (7, 6) for the medium. In the outlet opening (6), a pipe stub (11) is fixed with the aid of an elastic sleeve (12), which forms a seal between the opening edge (14) and the stub and between the stub and an intake conduit (15) coupled thereto. The pipe stub has a portion **(11*a*) extending into the filter housing, against which portion (11*a*) there seals a radial seal (17) on a filter element (2)** enclosed in the housing.

8 Claims, 2 Drawing Sheets

INTAKE AIR FILTER FOR AN INTERNAL COMBUSTION ENGINE

Figure 1:
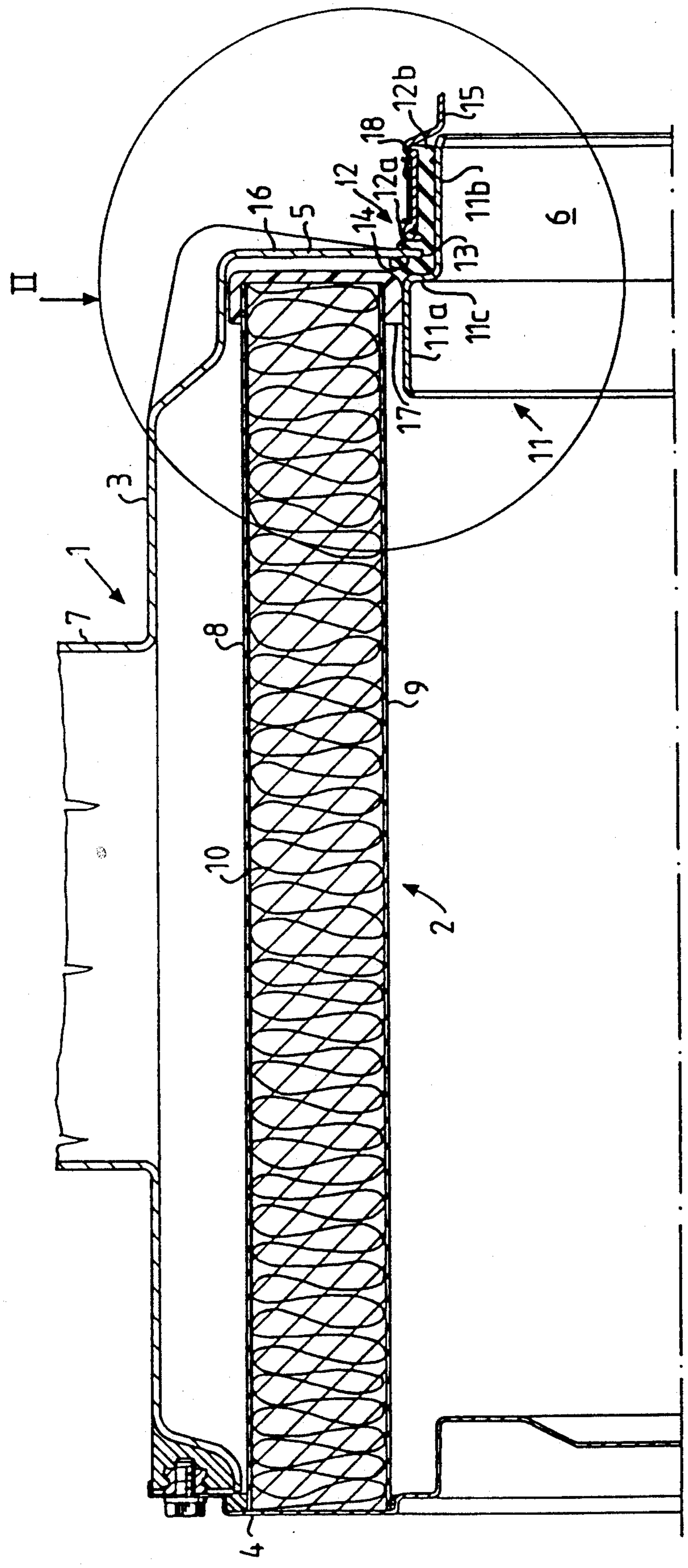

The present invention relates to a filter device for filtering a gaseous medium, comprising a filter housing with an inlet opening and an outlet opening for the medium, a filter element enclosed in the housing and disposed between said openings, and a pipe stub coupled to the outlet opening of the housing for coupling to a gas conduit, said pipe stub extending through the outlet opening and having a portion extending into the interior of the housing, which portion has a surface which can form a sealing surface against a seal on the filter element.

A common type of air filter for internal combustion engines has a cylindrical filter housing with the outlet opening at one end. The pipe stub for connecting the filter to an intake conduit is fixed to the housing end plate and the filter element, which typically has a tubular filter body, abuts with one end against the end surface surrounding the outlet with a seal therebetween, which is compressed when the filter body is pressed against the outlet end plate by the other end plate of the housing, which serves as a cover when in place.

These axially sealing filters have a major disadvantage. Due to the fact that the filter must be fitted between the housing end plates, special attention must be paid to the axial dimension of the filter element and the filter housing. Any deviations can result in leakage or damage to the filter element.

A known solution to this problem is to seal the filter element radially. The filter element is provided on its inner lateral surface at its outlet end with a radial sealing ring, which seals against the pipe end forming an extension of the outlet stub extending into the filter housing. Thus the only requirement as to axial fit is that the filter seal must enter the stub.

The requirement of a pipe end extending into the filter housing, against which the filter element seals, creates, however, production technical problems. For instance, an inwardly directed cylindrical surface cannot be produced by blow moulding of the housing. A solution to this problem, which is described in U.S. Pat. No. 4,720,292, for example, is to make the outlet stub separately from the filter housing and to fix it to the outlet end plate in such a manner that the end portion of the outlet stub extends into the filter housing.

The purpose of the present invention is, starting from the known solution mentioned above, to achieve a filter device of the type described by way of introduction which is simple to manufacture and assemble and which provides a good stress distribution between the outlet stub and the filter housing as well as providing an effective seal between the stub and an intake conduit coupled thereto.

This is achieved according to the invention by virtue of the fact that an elastic angular element is placed between the edge of the outlet opening and the outer surface of the pipe stub and extends axially out over the pipe stub to form a seal between the pipe stub and a gas conduit coupled thereto.

According to a preferred embodiment of the filter device according to the invention, the elastic angular element is provided on its exterior with a peripheral groove, into which there extends an edge portion of the housing surrounding the outlet opening.

This makes assembly quite simple. An elastic element, e.g. in the form of a rubber sleeve, is folded radially, is inserted into the outlet opening of the housing and is allowed to expand so that the edge portion slips into the groove. The outlet stub is then inserted into the sleeve which is thus fixed in its expanded state. Thus a single element serves as an elastic fixing means for the pipe stub, as a vibration absorbing means between the intake conduit and the filter housing and as a sealing device between the pipe and the intake conduit as well as compensating means for variations in the axial dimensions.

Figure 2:
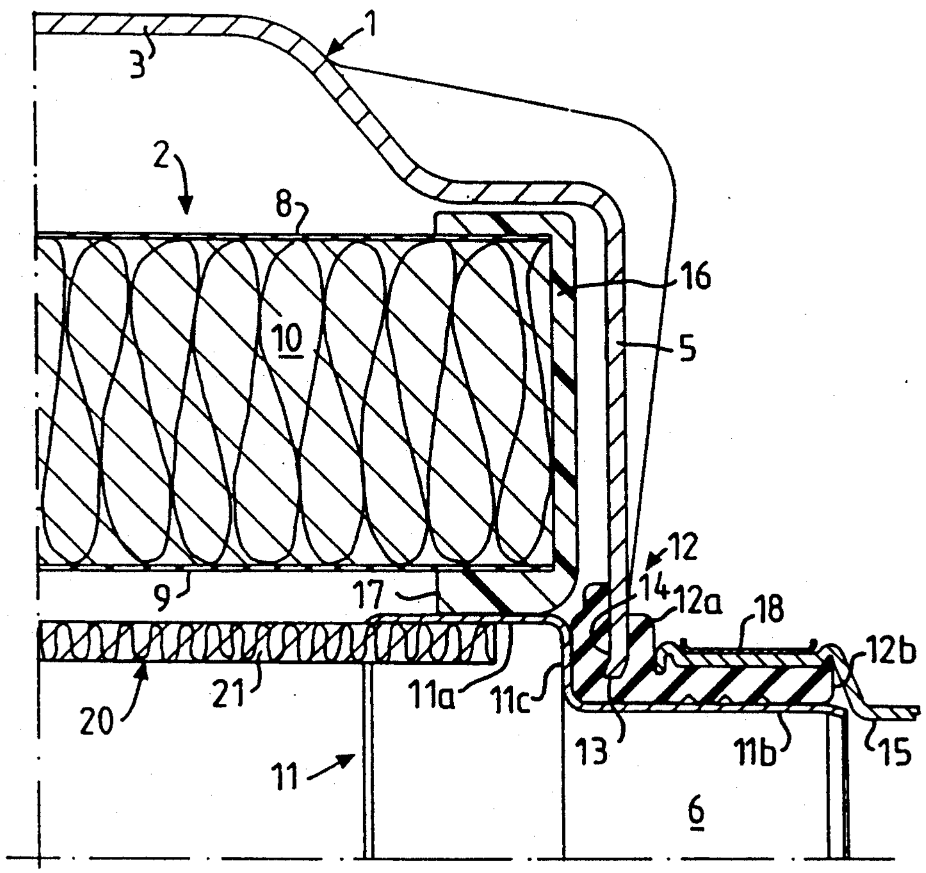
Figure 3:
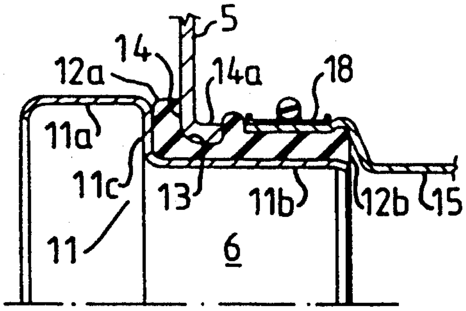
Figure 4:
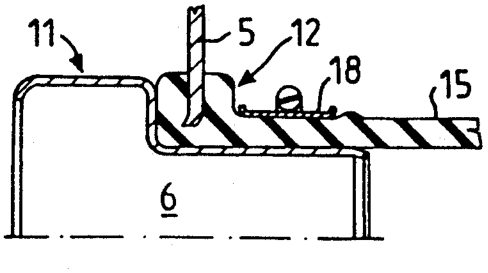

The invention will be described in more detail below with reference to examples shown in the accompanying drawings, of which FIG. 1 shows a longitudinal section through the upper half of a filter device according to the invention, and FIGS. 2-4 show partial views in longitudinal section of three modified embodiments in the area marked II in FIG. 1.

The reference numeral 1 in FIG. 1 generally designates a filter housing and the reference numeral 2 generally designates a filter element enclosed in the housing 1. The housing 1 consists of a cylindrical element 3 of blow moulded plastics material, for example, with end plates 4 and 5, of which the end plate 4 forms a cover screwed onto the cylinder 3 and fixed to the filter element, whereas the end plate 5 is integral with the cylinder 3 and has an outlet opening 5. An inlet pipe 7 opens into the cylinder 3. The filter element 2 comprises a pair of perforated coaxial cylinders 8 and 9 with an intermediate filter material 10 of a type which is known per se, e.g. folded paper or steel wool.

A pipe stub 11 in plastic or metal is fixed in the housing opening 6 with the aid of a sleeve 12 of rubber or a material similar to rubber. The stub 11 has a portion 11*a* of larger diameter than the portion 11*b* of smaller diameter and a radial wall portion 11*c* forming a transition between the portions 11*a* and 11*b*. The sleeve 12 has a thicker portion 12*a* and a thinner portion 12*b*. The radial wall serves as an abutment surface for the thicker end of the sleeve 12. The opposite end of the sleeve 12 extends out to the outer end of the pipe stub 11. The thicker portion 12*a* of the sleeve 12 has a peripheral groove 13, into which an edge portion 14 of the housing wall 5 extends. The end 15 of an engine intake conduit is forced over the sleeve portion 12*b* and is secured by a hose clamp 18.

The right hand end (FIG. 1) of the filter element 2 is covered by a thermoplastic elastomer, e.g. PUR, which forms a cover 16 which has an angular portion 17 extending into the inner cylinder or liner 9 of the filter element and forming a radial seal against the pipe stub portion 11*a*. Alternatively, the component 16 can be a sheet metal cover with a seal 17 glued thereto.

When mounting the filter device 1, the sleeve 12 is first folded and inserted into the opening 6, so that the groove 13 is in alignment with the edge portion 14, whereafter the sleeve is allowed to expand to its original shape, so that the edge portion 14 slips into the groove 13. The pipe stub 11 is then inserted from the left as seen in the Figures until the radial surface 11*c* comes into contact with the left hand end of the sleeve. The subsequent securing of the intake conduit end 15 to the sleeve 12 results in the housing 1, the pipe stub 11, the sleeve 12 and the conduit end 15 being secured in relation to each other. The elasticity of the thicker portion 12*a* of the sleeve 12, however, provides a certain amount of relative movement between the pipe stub 11 and the housing end plate 5 to compensate for dimensional variations, distribute stress and absorb vibrations. After installation of the filter element 2, the sealing ring 17 helps keep the mounting of the pipe stub firm in the housing.

FIG. 2 shows a filter device according to the invention in a further developed form. The pipe stub 11 is here permanently fixed to a secondary or safety filter 20. In other respects the embodiment agrees with that described above and the same reference numerals have been used as in FIG. 1 for corresponding components in FIG. 2. The secondary filter comprises a perforated tube 21, the right hand end of which as seen in FIG. 2 is permanently fixed to the pipe stub 11, e.g. by adhesive.

When replacing the main filter 2, the secondary filter 20 prevents dirt from being sucked into the engine if it should be started without the main filter in connection with service. The same applies should the main filter be damaged. When removing the secondary filter, the hose clamp 18 around the intake conduit 15 must be removed since the outlet stub 11 is removed with the secondary filter.

FIG. 3 shows an embodiment which differs from that shown in FIG. 1 only by a somewhat altered shape of the thicker portion 12*a* of the sleeve 12 and the edge portion 14 of the housing. The groove 13 is wider and the edge portion 14 is made with an axial flange 14*a*. By adjusting the elasticity and the thickness of the sleeve portion 12*a*, the width of the groove 13 and the shape of the edge portion 14, it is possible to regulate the angular alignment error which can be compensated for between the stub, the intake conduit and the filter housing, as well as the stress distribution.

FIG. 4 shows an embodiment in which the intake conduit 15 is made in one piece with the sleeve 12. Even though the invention was developed primarily to solve the problem involved in radially sealing filters, as revealed in FIGS. 1 and 2, it is obvious that a filter housing with the sleeve and pipe stub arrangement described can also be used for axially sealed filters, in which case the outer surface of the inwardly directed flange will not be used. In this case one also enjoys the advantage of simple assembly, vibration absorption and sealing between the stub and the intake conduit.

We claim:

1. Filter device for filtering a gaseous medium, comprising a filter housing with an inlet opening and an outlet opening for the medium, a filter element enclosed in the housing and disposed between said openings, and a pipe stub coupled to the outlet opening of the housing for coupling to a gas conduit, said pipe stub extending through the outlet opening and having a portion extending into the interior of the housing with a surface which can form a sealing surface against a seal on the filter element, characterized in that an elastic angular element (12) is placed between the edge (14) of the outlet opening and the outer surface of the pipe stub (11) and extends axially out over the pipe stub to form a seal between the pipe stub and a gas conduit (15) coupled thereto.

2. Filter device according to claim 1, characterized in that the elastic angular element (12) is made in one piece with the gas conduit (15) coupled thereto.

3. Filter device according to claim 1, characterized in that the pipe stub (11) has portions (11*a*, 11*b*) with different diameters and that the elastic angular element (12) is in contact with a radial wall (11*c*) forming a transition between the portions with different diameters.

4. Filter device according to claim 1, characterized in that the elastic angular element (12) is provided on its exterior with a peripheral groove (13), into which there extends an edge portion (14) surrounding an outlet opening (6).

5. Filter device according to claim 4, characterized in that the elastic angular element (12) has an end portion (12*a*) of larger thickness than the remaining portion (12*b*) and the peripheral groove (13) is disposed in said end portion.

6. Filter device according to claim 5, characterized in that the larger diameter portion (11*a*) of the pipe stub (11) extends into the filter housing (1) and that the end portion (12*a*) of the elastic angular element with larger thickness is in contact with said radial wall (11*c*).

7. Filter device according to claim 1, characterized in that the pipe stub portion (11*a*) extending into the filter housing has an outer surface forming a sealing surface against the inner surface of a sealing ring (17) on a cylindrical main filter element (2), and an inner surface which forms a sealing surface against the outer surface of a sealing ring (22) on a secondary or safety filter (20) arranged concentrically in the main filter element.

8. Filter device according to claim 7, characterized in that the pipe stub (11) is permanently fixed to the secondary or safety filter (20).

* * * * *